(12) United States Patent
Leugemors et al.

(10) Patent No.: US 8,784,082 B2
(45) Date of Patent: Jul. 22, 2014

(54) LOCKING DEVICE FOR PACKING ASSEMBLY

(75) Inventors: Edward Leugemors, Needville, TX (US); Joe Hubenschmidt, Sugar Land, TX (US)

(73) Assignee: Schlunberger Technology Corporation, Sugar Land, TX (US)

( * ) Notice: Subject to any disclaimer, the term of this patent is extended or adjusted under 35 U.S.C. 154(b) by 238 days.

(21) Appl. No.: 13/095,332

(22) Filed: Apr. 27, 2011

(65) Prior Publication Data
US 2011/0289753 A1    Dec. 1, 2011

Related U.S. Application Data

(60) Provisional application No. 61/348,934, filed on May 27, 2010.

(51) Int. Cl.
*F04B 53/02*    (2006.01)
*F16K 35/10*    (2006.01)

(52) U.S. Cl.
USPC .......................... 417/572; 70/177; 70/DIG. 57

(58) Field of Classification Search
USPC ............ 417/572, 269; 70/176, 177, 229–232, 70/DIG. 57
See application file for complete search history.

(56) References Cited

U.S. PATENT DOCUMENTS

| | | | | |
|---|---|---|---|---|
| 1,494,098 A * | 5/1924 | Burk | ................................ | 70/260 |
| 1,687,966 A * | 10/1928 | Baver | .............................. | 70/259 |
| 4,269,221 A * | 5/1981 | Adams | ........................... | 137/383 |
| 4,273,455 A * | 6/1981 | Gubelmann et al. | .......... | 400/309 |
| 4,361,141 A * | 11/1982 | Tanner | ............................ | 606/252 |
| 5,017,330 A * | 5/1991 | Hurdiel | .......................... | 376/260 |
| 2010/0143163 A1 | 6/2010 | Patel et al. | | |
| 2011/0052423 A1 | 3/2011 | Gambier et al. | | |

FOREIGN PATENT DOCUMENTS

| | | | |
|---|---|---|---|
| WO | 2011027273 A2 | 3/2011 | |
| WO | 2011027274 A2 | 3/2011 | |

\* cited by examiner

*Primary Examiner* — Charles Freay (57) ABSTRACT

The current application discloses a locking device for a packing assembly. The device comprises a holding end and a locking end, wherein the holding end is configured to mechanically and/or frictionally engage a fixed component of a packing assembly and the locking end is configured to mechanically and/or frictionally engage at least a portion of the packing nut so as to prevent the packing nut from rotating or otherwise changing its position.

20 Claims, 7 Drawing Sheets

LOCKING DEVICE FOR PACKING ASSEMBLY

RELATED APPLICATION DATA

This application claims priority of U.S. Provisional patent application Ser. No. 61/348,934 filed May 27, 2010, which is incorporated by reference herein.

FIELD OF APPLICATION

At the outset, it should be noted that The current application is generally related to locking devices for packing assemblies. In particular, the locking device of the current application can be used to stabilize the packing assembly in various machines, especially the wellsite surface equipment such as fracturing pumps and the like.

BACKGROUND

At the outset, it should be noted that statements made herein merely provide information related to the present disclosure and do not constitute any admission of prior art.

Packing assemblies have been used widely in various machines. In the field of oil and gas exploration and production, one such machine is the hydraulic fracturing pump that is typically used at the wellsite to pump a large quantity of fluid downhole at relatively high pressures to fracture rocks. Oil can then migrate to the wellbore through the fractures and the well productivity is significantly enhanced. A few examples of the fracturing pump have been disclosed in commonly assigned patent application publication Nos. US2011/0052423, WO 2011/027273, and WO 2011/027274, the contents of which are hereby incorporated by reference into the current application in the entireties.

Notwithstanding the developments, there remains a need to further improve the machines, especially to stabilize the packing assembly and enhance the overall integrity of the machine.

SUMMARY

According to one aspect of the current application, there is disclosed a locking device for a packing assembly. The device comprises a holding end and a locking end, wherein the holding end is configured to mechanically and/or frictionally engage a fixed component of a packing assembly and the locking end is configured to mechanically and/or frictionally engage at least a portion of the packing nut so as to prevent the packing nut from rotating or otherwise changing its position. In some embodiments, each of the holding end and the locking end is in the shape of a hook, clamp, latch, or a closed loop. In one specific embodiment, the holding end is in the shape of a hook and the locking end is in the shape of a latch.

In some cases, the hook-shaped holding end has an inner space and a tip opening, and the inner space has a diameter that is larger than a clearance of the tip opening. In some cases, the locking end has a lower side adjacent to the latch, and a profile of the latch and the lower side is substantially complementary to a profile of a corresponding structure of the packaging nut.

In some cases, the locking device further comprises a spacer attached to a surface of the locking device so as to set the locking device at a distance from a plate upon which the packing nut is attached. In a specific embodiment, the spacer is a magnetic disc.

According to another aspect of the current application, there is disclosed an assembly comprising a packing nut, a rod, and a locking device that connects the packing nut and the rod via a mechanical and/or frictional force. The locking device comprises a holding end and a locking end, and the holding end is configured to mechanically and/or frictionally engage the rod and the locking end is configured to mechanically and/or frictionally engage at least a portion of the packing nut so as to prevent the packing nut from rotating or otherwise changing its position.

In some embodiments, the rod contains a portion having a substantially different diameter from that of an adjacent portion of the rod. Specifically, the rod may contain a stepped ring having a diameter larger than that of an adjacent portion of the rod. In some embodiments, each of the holding end and the locking end is in the shape of a hook, clamp, latch, or a closed loop. In a specific embodiment, the holding end is in the shape of a hook and the locking end is in the shape of a latch.

In some cases the hook-shaped holding end has an inner space and a tip opening, and the inner space has a diameter that is larger than a clearance of the tip opening. The inner space may have a profile that is substantially complementary to that of the stepping ring and the clearance of the tip opening may be substantially the same or slightly larger than the adjacent portion of the rod. Furthermore, the locking end may have a lower side adjacent to the latch, and a profile of the latch and the lower side is substantially complementary to a profile of a corresponding structure of the packaging nut.

In some embodiments, the assembly may further comprise a spacer attached to a surface of the locking device so as to set the locking device at a distance from a plate upon which the packing nut is attached. In a specific embodiment, the spacer is a magnetic disc.

According to a further aspect of the current application, there is disclosed a method of locking a packing nut in a packing assembly. The method comprises fastening the packing nut to a desired position, providing a locking device having a holding end and a locking end, attaching the holding end of the locking device to a fixed component of the packing assembly, and attaching the locking end of the locking device so as to prevent the packing nut from turning, rotating or otherwise changing its position.

In some embodiments, the step of attaching the locking end of the locking device is achieved by first providing the fixed component with a large portion having a relatively large dimension and a small portion having a relatively small dimension, followed by providing the holding end of the locking device with a tip opening and an inner space, wherein a clearance of the tip opening is substantially the same as, or slightly bigger than, the dimension of the small portion of the fixed component, and a dimension of the inner space is substantially the same as, or slightly bigger than, the dimension of the large portion of the fixed component. Then the small portion of the fixed component can be passed through the tip opening of the locking device, and the fixed component can be moved within the inner space of the locking device along until the large portion of the fixed component reaches the inner space of the locking device and forms a mechanical and/or frictional connection therewith.

In some embodiment, the method may further comprise providing a magnetic spacer on a surface of the locking device so as to set the locking device at a distance from a plate upon which the packing nut is attached

BRIEF DESCRIPTION OF DRAWINGS

These and other features and advantages will be better understood by reference to the following detailed description when considered in conjunction with the accompanying drawings.

FIG. 6B-1 and 6B-2 are back and front side views, respectively, of the locking device as in FIG. 6A.

FIG. 6C-1 and 6C-2 are left and right side views, respectively, of the locking device as in FIG. 6A.

DETAILED DESCRIPTION OF SOME ILLUSTRATIVE EMBODIMENTS

For the purposes of promoting an understanding of the principles of the current application, reference will now be made to the embodiments illustrated in the drawings and specific language will be used to describe the same. It will nevertheless be understood that no limitation of the scope of the application is thereby intended, any alterations and further modifications in the illustrated embodiments, and any further applications of the principles of the system, apparatus, and method as illustrated therein as would normally occur to one skilled in the art to which the current application relates are contemplated herein.

Referring now to the figures of the current application, there is disclosed a pump body portion or fluid end, indicated generally at 100, of a hydraulic fracturing pump. In some cases, three pump body portions 100 are arranged to form a triplex pump assembly 112, best seen in FIG. 1. Those skilled in the art will appreciate that the pump body portions 100 may also be arranged in other configurations, such as a quintuplex pump assembly comprising five pump body portions 100 or the like. Other pumps, such as water pumps, mud pumps, delta pumps, etc. can also implement embodiments of the current application.

Figure 1:
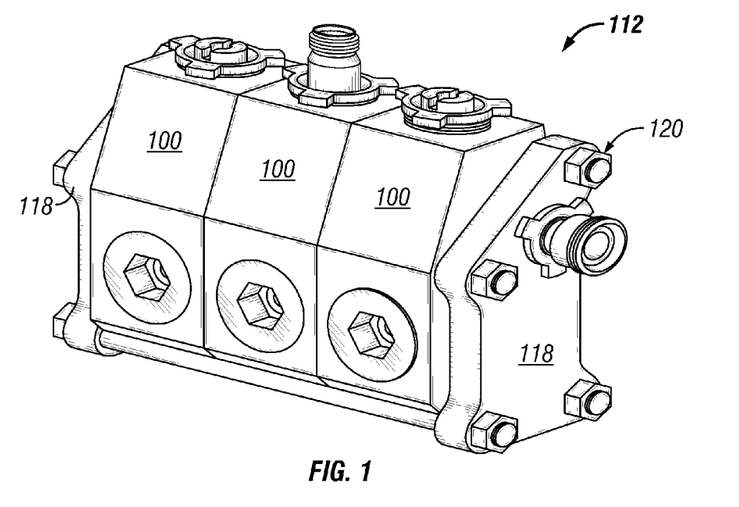
FIG. 1 is a schematic illustration of a triplex pump upon which the current application can be used.
Figure 2:
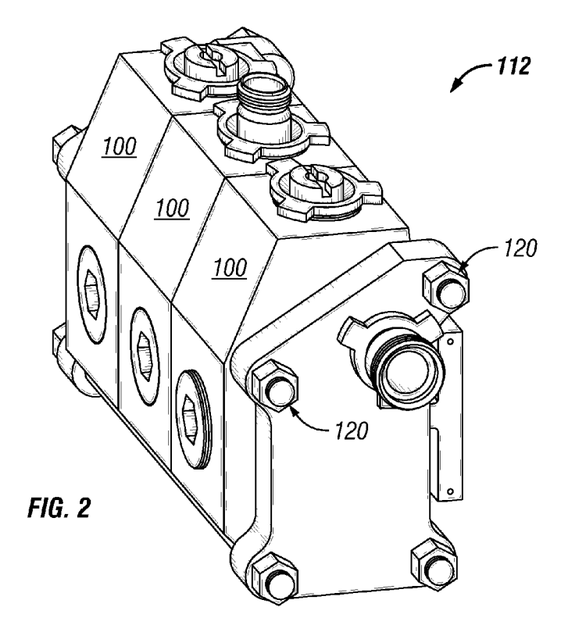
FIG. 2 is a schematic illustration of the triple pump as in FIG. 1 from a different angle.
Figure 3:
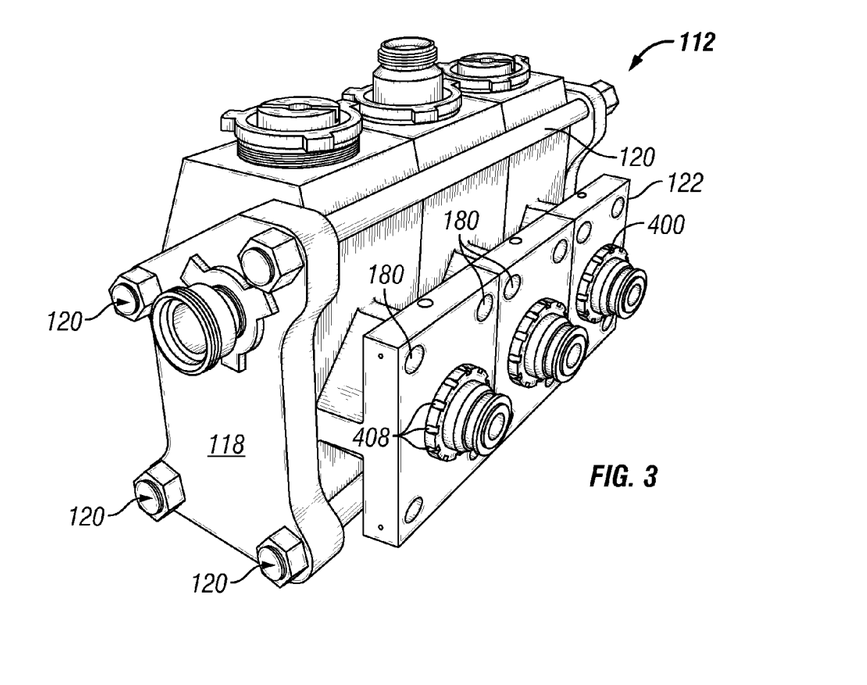
FIG. 3 is a schematic illustration of the triple pump as in FIG. 1 from yet a different angle.

In some embodiments, an end plate 118 is fitted on each of the outer or side pump body portions 100 to aid in assembling the body portions 100 into the pump assembly, such as the triplex pump assembly 112 shown in FIGS. 1 to 3. The end plates 118 are utilized, in conjunction with fasteners 120, to assemble the pump body portions 100 to form the pump assembly 112.

An attachment flange 122, best seen in FIG. 3, may extend from the pump body portion 100 for guiding and attaching an adaptor (not shown) to the power end 150 and ultimately the pony rods 152 to the plungers (see FIG. 4) and ultimately to a prime mover (not shown), such as a diesel engine or the like, as will be appreciated by those skilled in the art.

Figure 5:
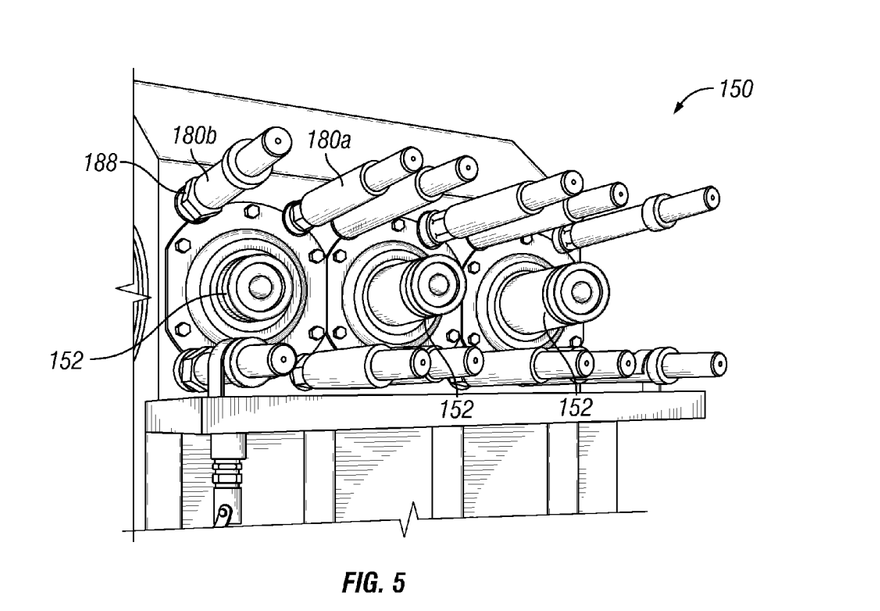
FIG. 5 is a schematic illustration of the triple pump as in FIG. 1 with packing nuts and rods attached.

The attachment flange 122 may further comprise a plurality of holes 180 and have a plurality of rods 186 attached thereto, as shown in FIG. 5 of the current application. Typically, the rods 186 are substantially cylindrical in shape, comprising a body portion and at least one end portion that is threaded or otherwise adapted for attaching to the hole 180. The body portion can be substantially uniform in diameter along the length of the body, as shown as rod 186a in FIG. 5 of the current application. In another embodiment, at least one portion of the body of the rod is enlarged to form a stepped ring 188, as shown as rod 186b in FIG. 5 of the current application. In some cases, the stepped ring 188 is formed towards the end of the rod 186b that will be attached to the attachment flange 122, so that the locking device 500 can be attached to the stepped ring 188 at a close distance to the attachment flange 122 (to be discussed in more details below). Variations to this embodiment are possible. For example, in one aspect, instead of forming an enlarged portion such as a stepped ring 188 on the rod, people skilled in the art may design a rod having a portion of the rod that is smaller in diameter than the rest of the rod. As long as the rods contain at least one portion of the body having a diameter that is larger than the diameter of an adjacent portion of the body of the rod, such designs should be considered as being within the disclosure of the current application.

Figure 4:
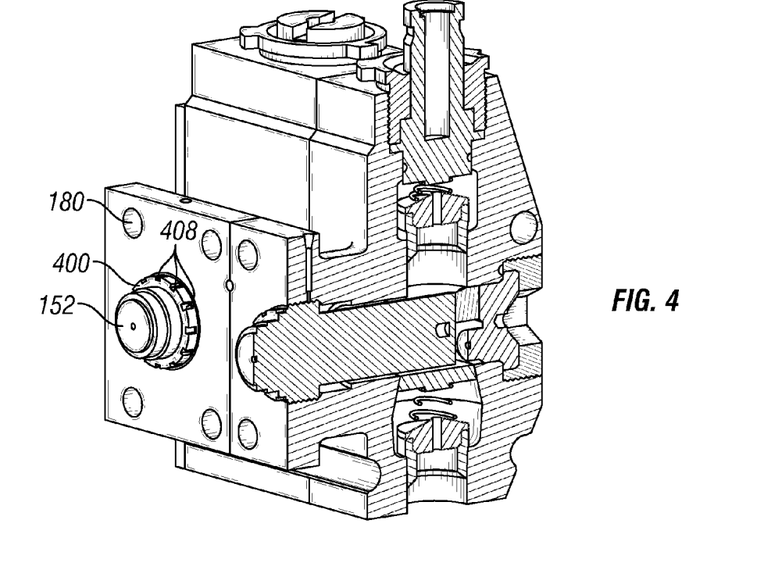
FIG. 4 is a partial cross-sectional view of the triple pump as in FIG. 1.

Referring to FIGS. 3 and 4 of the current application, a packing nut 400 is provided for attaching the pony rod 152 to the plunger and/or the attachment flange 122, may be by a clockwise rotation of the packing nut 400 via a threading mechanism. The packing nut 400 can be substantially round in shape. However, other shapes that are commonly used in the industry or can be readily perceived by people skilled in the art can be used in the current application as well.

In one embodiment, the packing nut 400 comprises a plurality of slots 408 for engagement of tools that can be used to fasten or loosen the packing nut 400 from the plunger and or the attachment flange 122. The slots 408 may be evenly distributed along the edge of the packing nut 400 or strategically positioned according to the specific requirements of the design. In another embodiment, the slots 408 are in the forms of groves or holes. In yet another embodiment, the packing nut 400 may contain no slots or groves or holes. Instead, a rubber ring or other frictional material is provided along the edge of the packing nut 400, upon which a fastening tool can engage the packing nut 400 and turn the packing nut 400 by friction force.

Referring now to FIG. 6 of the application, there is provided a locking device 500 that is capable of locking and maintaining the packing nut 400 in position after the packing nut 400 is fastened into a desired location. In one embodiment, the locking device 500 comprises a holding end 510 and a locking end 520, wherein the holding end 510 is configured to mechanically and/or frictionally engage a fixed component of a packing assembly and the locking end 520 is configured to mechanically and/or frictionally engage at least a portion of the packing nut 400 so as to prevent the packing nut 400 from rotating or otherwise changing its position.

Figure 6A:
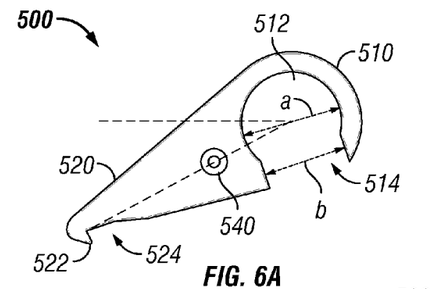
FIG. 6A is a top view of a locking device according to certain embodiments of the current application.
Figure 6B:
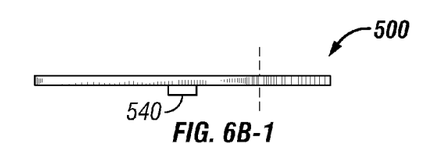
Figure 6B:
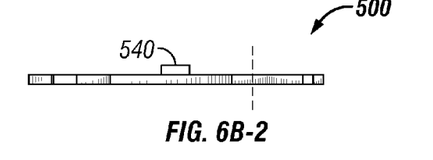
Figure 6C:
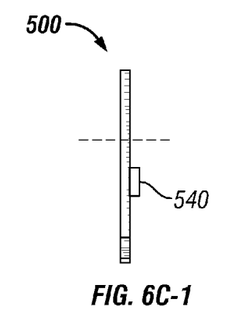
Figure 6C:
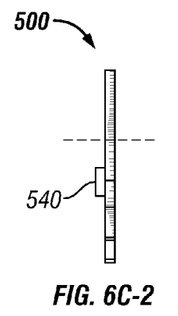

According to one embodiment of the application, the holding end 510 of the locking device 500 has a substantially hook-shaped structure, wherein the hook defines a substantially round-shaped inner space 512 having a diameter of "a" as indicated in FIG. 6A of the current application, and a tip opening 514 with a clearance of "b" as indicated in FIG. 6A of the current application. In some cases, the diameter "a" of the inner space 512 is substantially the same as, or slightly larger than, the diameter of at least a portion of the rod 186, so that when the holding end 510 of the locking device 500 is slid onto the rod 186, a snug fit can be achieved. In some cases, the clearance "b" of the tip opening 514 of the holding end 510 of the locking device 500 is substantially smaller than the diameter "a" of the inner space 512 of the holding end 510. Therefore, once the locking device 500 is attached to the rod 186, the locking device 500 may not be detached from the tip opening 514.

In some embodiments, where a stepped ring 188 is provided at one position of the body of the rod 186b and the stepped ring 188 has a diameter that is larger than the diameter of the adjacent portion of the body of the rod, the locking device 500 is so designed that the diameter "a" of the inner space 512 of the holding end 510 is substantially the same as, or slightly bigger than, the diameter of the stepped ring 188, and the clearance "b" of the tip opening 514 of the holding end 510 is substantially the same as, or slightly bigger than, the diameter of the adjacent portion of the body of the rod 186b. Therefore, the holding end 510 of the locking device can be attached to the rod 186b by first passing the said adjacent portion of the body of the rod 186b through the tip opening 514 of the holding end 510 and then sliding the locking device along the length of the rod 186b to the portion where the stepped ring 188 is located. Because the stepped ring 188 has a diameter that is substantially the same as, or slightly smaller than, the diameter of the inner space 514 of the holding end 510 of the locking device 500, a snug fit can be achieved between the inner space 514 of the locking device 500 and the stepped ring 188 of the rod 186b. Also, because the tip opening 514 is smaller than the diameter of the stepped ring 188, the locking device 500 may not be detached from stepped ring 188 portion of the rod 186b via the tip opening 512.

Figure 9A:
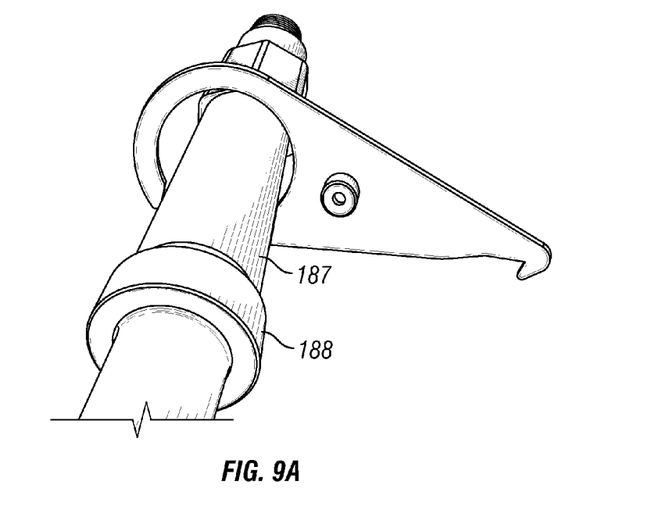
FIG. 9A-9D are schematic illustrations of a method of assembling a locking device on a rod according to certain embodiments of the current application.
Figure 9B:
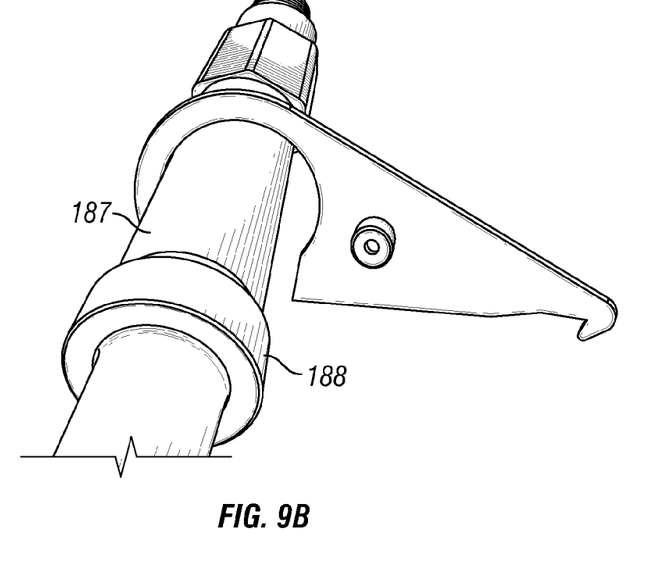
Figure 9C:
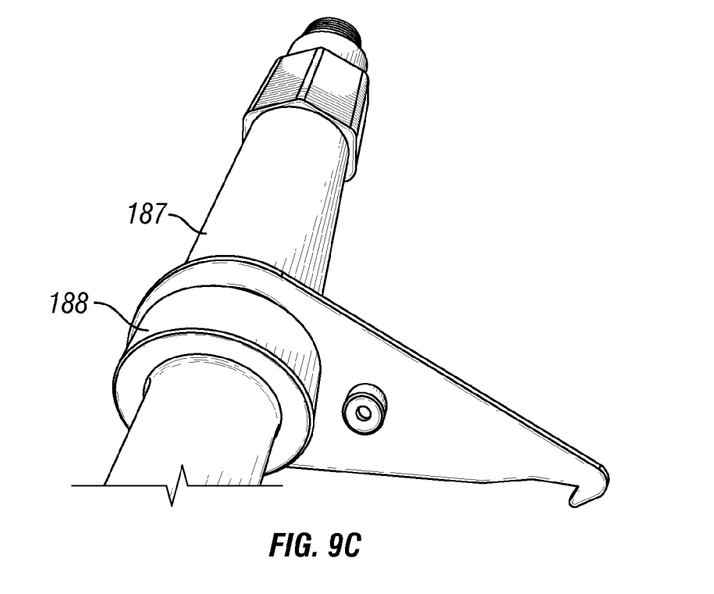
Figure 9D:
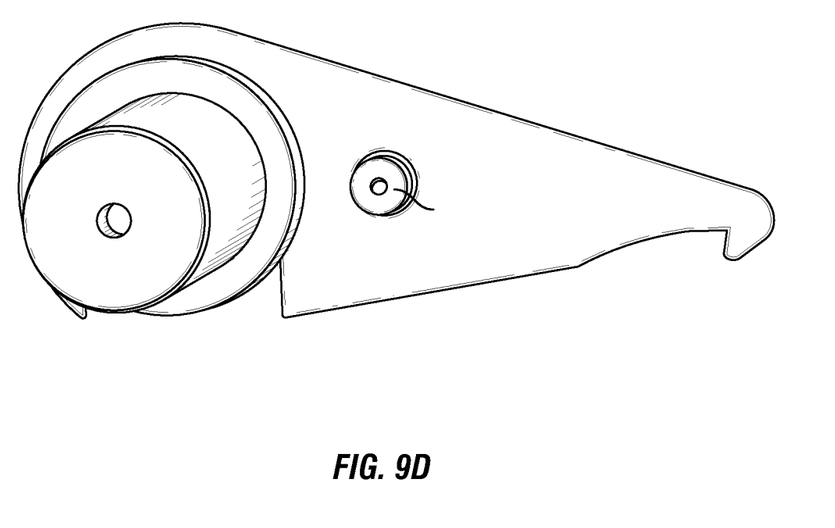

The process of attaching the holding end 510 of the locking device 500 to the stepped ring 188 of the rod 186b can be further illustrated in FIGS. 9A to 9D of the current application. In FIG. 9A, the locking device 500 is first applied at position 187 of the rod 186b where the diameter is smaller compared with the stepped ring 188. Because the clearance "b" of the tip opening 514 of the holding end 510 is substantially the same as, or slightly bigger than, the diameter of position 187 of the rod 186b, there should be no difficulty passing the rod 186b through the tip opening 512 into the inner space 512 of the locking device 500, as shown in FIG. 9B of the current application. Thereafter, the locking device 500 can be slid along the longitudinal axis of the rod 186b, as shown in FIG. 9C of the application, until the locking device 500 reaches the stepped ring 188 of the rod 186b and form a snug fit thereupon, as shown in FIG. 9D of the application. Should the rod have a shape that differs from the one illustrated in FIG. 9, modifications to the attaching process may be easily achieved without departing from the essence of the current application.

It should be noted that various modifications to the above described holding end 510 can be achieved without departing from the essence of the current application. For example, in one aspect, instead of a hood-shaped structure, the holding end 510 may take the form of a closed loop with no opening on the surrounding structure of the inner space 512. In such an embodiment, the locking device needs to be slid into the rod from one end of the rod instead of at the body of the rod. Moreover, instead of having a substantially round-shaped profile at the inner space 512, the holding end 510 of the locking device 500 can be designed in shapes such as triangle, hexagon, octagon, etc. All such variations should be considered as being within the scope of the current application.

Figure 7:
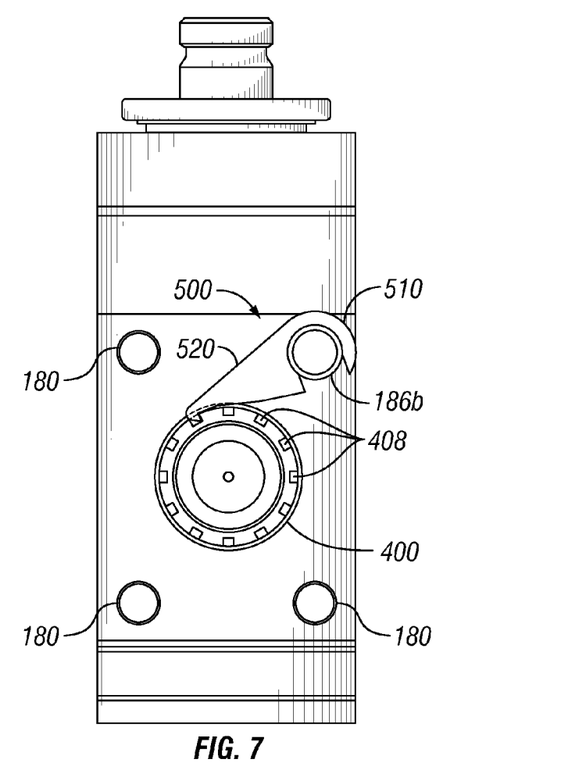
FIG. 7 is a schematic illustration of the front view of a locking device engaged on a pump.

Referring now to the locking end 520 of the locking device 500, in one embodiment, the locking end 520 comprises a latch 522 which extends substantially downwardly from the longitudinal axis of the locking device 500. The latch 522 is configured in such a manner that the length and angle of the latch 522 render the latch 522 capable of engaging one of the slots 408 of the packaging nut 400 via mechanical force, so as to prevent the packaging nut 400 from turning, rotating or otherwise changing its position. FIG. 7 illustrates a locking device 500 that is mechanically engaged with a slot 408 of a packing nut 400 at one end (i.e. the locking end 520) and with a rod 186b at the other end (i.e. the holding end 510).

To enhance the fitting of the locking end 510 of the locking device 500 into the slot 408 of the packing nut 400, the lower side 524 of the locking device 500 can be cut into a profile that is substantially complementary to the contour of the surface that is adjacent to the slot 408 of the packing nut 400. However, it may also be desirable to increase the versatility of the locking device 500. Accordingly, in some embodiments, only a small portion of the lower side 524 of the locking end 524 which is immediately adjacent to the latch 522 is constructed in a shape that is substantially complementary to the contour of the packing nut 400. The rest of the lower side 524 can take the form that differs from the contour of the packing nut 400 so that the locking device 500 can be used on packing nuts with different shapes and dimensions.

It should be noted that various modifications to the above described locking end 520 can be achieved without departing from the essence of the current application. For example, in some cases, if the packing nut 400 is equipped with round holes (not shown) instead of slots 408, the locking mechanism of the locking end 520 may comprise a cylindrically shaped protrusion that is complementary in shape and dimension to the round holes (not shown) located on the surface of the packing nut 400. Alternatively, the locking end 520 may be in the shape of a hook, clamp, or a closed loop to embrace the packing nut 400. This configuration may be especially desirable when a rubber ring or other frictional material is provided along the edge of the packing nut 400 and the friction force constitutes a significant portion of the mechanism to lock the packing nut 400 in position. It should also be noted that when the packing nut 400 is in a polygonal shape, such as a triangle, hexagon, octagon, etc., it is also possible to engage the packing nut 400 by way of a hook, claim, or a closed loop which is shaped substantially complementary to the perimeter of the packing nut 400. All such variations should be treated as within the scope of the current application.

Figure 6D:
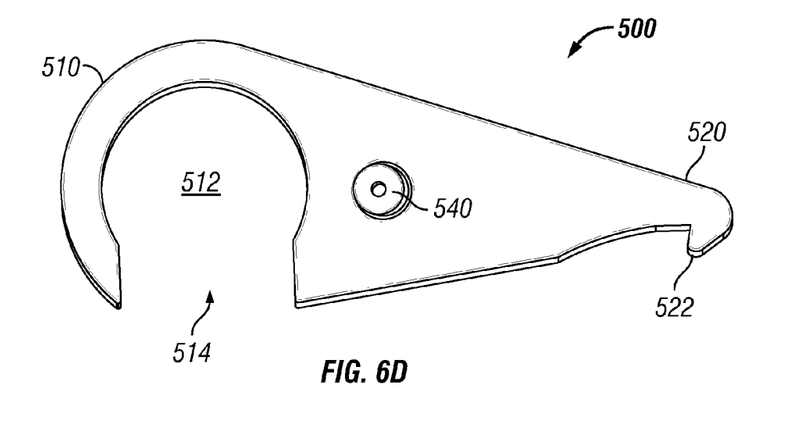
FIG. 6D is a perspective view of the locking device as in FIG. 6A.
Figure 8:
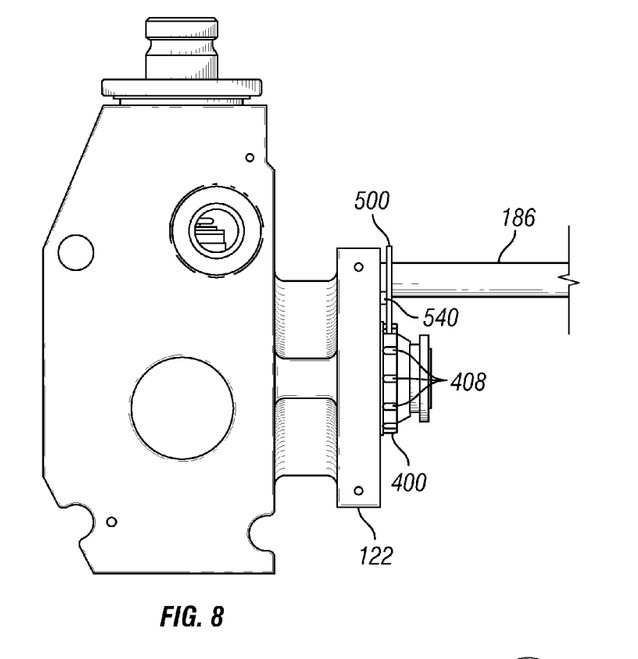
FIG. 8 is a schematic illustration of the side view of a locking device engaged on a pump.

In some embodiments, the locking device 500 may further comprise a spacer 540 that is either attached or fastened to a surface of the locking device 500, as shown in FIGS. 6A and 6D of the application. In one aspect, the surface faces the attachment flange 122. Two side views of the locking device 500 with a spacer 540 attached thereto are shown in FIGS. 6B and 6C, respectively. The spacer 540 may function as a clearance device to set the locking device 500 at a desired distance between the locking device 500 and the attachment flange 122, as shown in FIG. 8 of the current application, which depicts a side view of the packing assembly with the locking device 500 securely attached to the rod 186 and packing nut 400. There, with the help of the spacer 540, the locking device 500 is positioned in a plane that is substantially parallel to the surface of the attachment flange 122. In a further embodiment, the spacer 540 is made from a magnetic material, so that it adheres the body of the locking device 500 to the attachment flange 122 via magnetic force. Such a configuration will further increase the stability of the locking device 500 when it is engaged with the packing assembly.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should not be read as pertaining only to the precise structures described and shown in the accompanying drawings, but rather should be read as consistent with and as support for the following claims, which are to have their fullest and fairest scope.

Furthermore, none of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle. The claims as filed are intended to be as comprehensive as possible, and NO subject matter is intentionally relinquished, dedicated, or abandoned.

What is claimed is:

1. A locking device for a packing assembly, the device comprising:
    a holding end and a locking end, wherein the holding end is configured to mechanically and/or frictionally engage a fixed component of a packing assembly and the locking end is configured to mechanically and/or frictionally engage at least a portion of a packing nut so as to prevent the packing nut from rotating or otherwise changing its position,
    wherein the holding end comprises a hook shape that defines an inner space and a tip opening, wherein the inner space has a diameter that is larger than a clearance of the tip opening and is configured to achieve a snug fit with the fixed component, and wherein the tip opening narrows inwardly from both a first side and a second side of the inner space at the clearance, the tip opening being configured to prevent the locking device from being detached from the fixed component via the tip opening.

2. The locking device of claim 1, wherein the locking end is in the shape of a latch.

3. The locking device of claim 2, wherein the locking end comprises a lower side adjacent to the latch, and wherein a profile of the latch and the lower side is substantially complementary to a profile of a corresponding structure of the packing nut.

4. The locking device of claim 1, further comprising a spacer attached to the locking device so as to set the locking device at a distance from a plate upon which the packing nut is attached.

5. The locking device of claim 4, wherein the spacer comprises a magnetic material.

6. The locking device of claim 4, wherein the spacer is positioned between the holding end and the locking end and is positioned away from the inner space of the holding end.

7. An assembly comprising:
    a packing nut;
    a rod; and
    a locking device that connects the packing nut and the rod via a mechanical and/or frictional force,
    wherein the locking device comprises a holding end and a locking end, and the holding end is configured to mechanically and/or frictionally engage the rod and the locking end is configured to mechanically and/or frictionally engage at least a portion of the packing nut so as to prevent the packing nut from rotating or otherwise changing its position.

8. The assembly of claim 7, wherein the rod comprises a portion having a substantially different diameter from that of an adjacent portion of the rod.

9. The assembly of claim 8, wherein the rod comprises a stepped ring having a diameter larger than that of an adjacent portion of the rod.

10. The assembly of claim 7, wherein the holding end is in the shape of a hook.

11. The locking device of claim 10, wherein the locking end is in the shape of a latch.

12. The locking device of claim 11, wherein the hook-shaped holding end has an inner space and a tip opening, and the inner space has a diameter that is larger than a clearance of the tip opening.

13. The assembly of claim 12, wherein the inner space has a profile that is substantially complementary to that of a stepping ring and the clearance of the tip opening is substantially the same or slightly larger than a portion of the rod that is adjacent to the stepping ring.

14. The assembly of claim 7, wherein the locking end has a lower side adjacent to the latch, and wherein a profile of the latch and the lower side is substantially complementary to a profile of a corresponding structure of the packing nut.

15. The assembly of claim 7, further comprising a spacer attached to the locking device so as to set the locking device at a distance from a plate upon which the packing nut is attached.

16. The assembly of claim 15, wherein the spacer comprises a magnetic material.

17. The assembly of claim 16, wherein the spacer comprises a disc.

18. A locking device for a packing assembly, the device comprising:
    a holding end configured to mechanically and/or frictionally engage a fixed component of a packing assembly;
    a locking end configured to mechanically and/or frictionally engage at least a portion of a packing nut so as to prevent the packing nut from rotating or otherwise changing its position; and
    a magnetic material that is configured to adhere the locking device to the packing assembly via a magnetic force.

19. The locking device of claim 18, further comprising:
    a body that defines the holding end and the locking end; and
    a spacer that is configured to position the body at a desired distance from a portion of the packing assembly, wherein the spacer comprises the magnetic material.

20. The locking device of claim 18, wherein the magnetic material comprises a magnetic disc.

* * * * *